A. G. WILLARD.
STARTING DEVICE FOR AUTOMOBILE AND OTHER ENGINES.
APPLICATION FILED JULY 13, 1906.
932,735.
Patented Aug. 31, 1909.
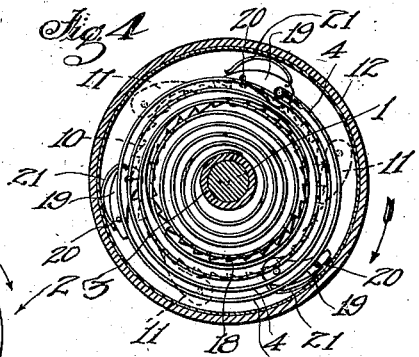
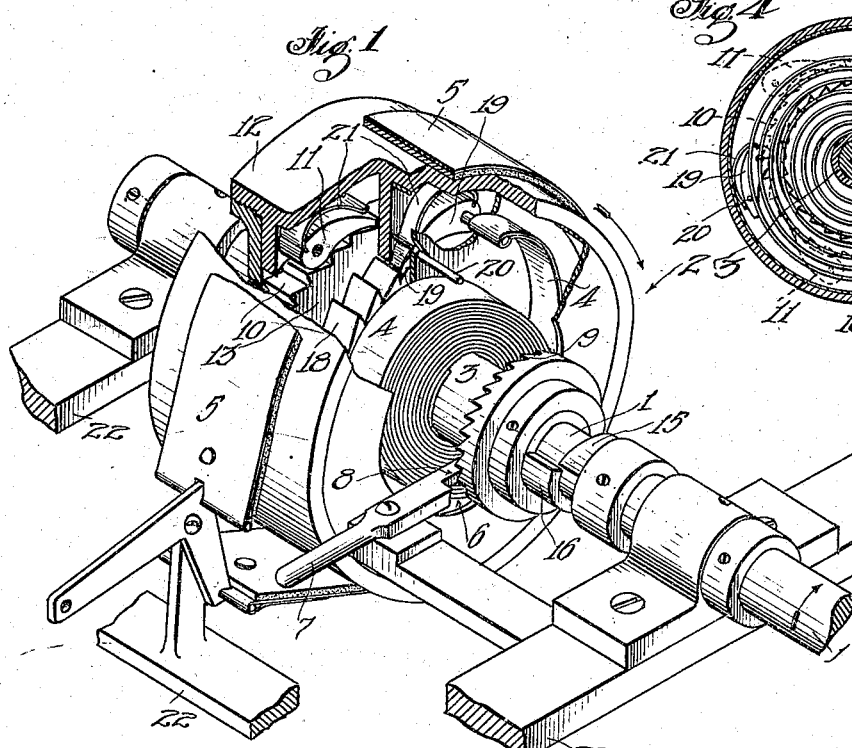
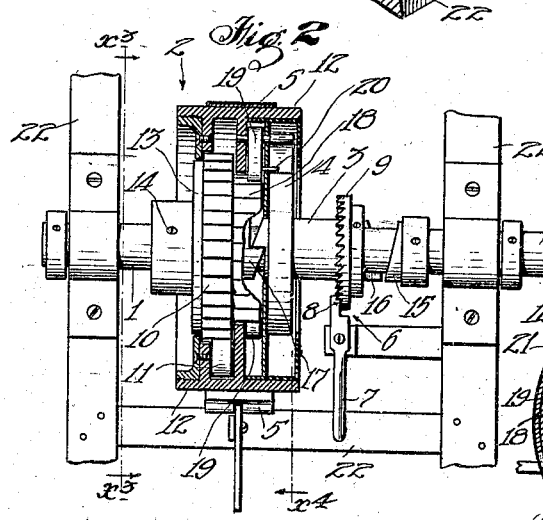
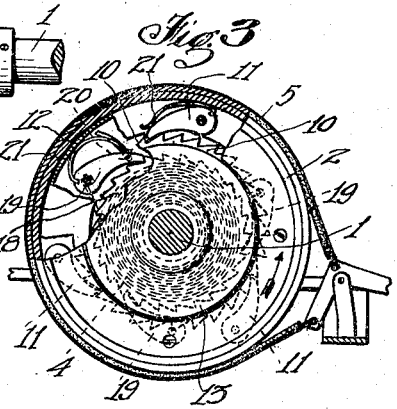
Witnesses
Inventor
Arthur G. Willard
by James R. Townsend
his Atty

ARTHUR G. WILLARD, OF BAKERSFIELD, CALIFORNIA.

STARTING DEVICE FOR AUTOMOBILE AND OTHER ENGINES.

932,735.
Specification of Letters Patent.
Patented Aug. 31, 1909.

Application filed July 13, 1906. Serial No. 326,120.

*To all whom it may concern:*

Be it known that I, ARTHUR G. WILLARD, a citizen of the United States, residing at Bakersfield, in the county of Kern and State of California, have invented a new and useful Starting Device for Automobile and other Engines, of which the following is a specification.

It is one of the objects of this invention to provide automatic means for starting an internal combustion engine for automobiles and the like, and to make power stored from the engine available for starting the engine a number of times without renewing the stored power.

Other objects and advantages may appear from the ubjoined detailed description.

The invention may be embodied in different forms, and I shall show the form I at present deem most desirable; but I do not limit the invention to the form herein shown.

The accompanying drawings illustrate the invention:—

Figure 1 is a perspective view illustrating the invention as the same may be applied for use with an automobile or other engine. Parts are broken away to expose parts that would otherwise not be shown. Fig. 2 is a plan, parts being broken away to show interior construction. Fig. 3 is a view from the left of Figs. 1 and 2, as indicated by the arrow at $x^3$ in Fig. 2, parts being broken away to show interior construction. Fig. 4 is a section on line $x^4$, Fig. 2, with partition removed to show the detents more clearly. The spring is shown unwound. The other views show the parts in position when spring is wound.

1 designates the power shaft driven by an engine, not shown. 2, a wheel mounted to rotate thereon in one direction only relative to the shaft. 3, a clutch rotatably mounted on the shaft to engage the wheel. 4, a spring connection between the wheel and clutch for causing relative rotation between the same.

5 in a general way indicates means for temporarily holding the wheel from turning, and 6 in a general way designates means to simultaneously release the clutch and to hold the same from turning. The wheel 2 may be a fly-wheel, or may be connected with or independent of the fly-wheel, and the means for temporarily holding the wheel from turning may be the ordinary friction brake for stopping the machine.

The clutch means may comprise a sleeve mounted to rotate on and slide along the shaft and adapted to engage to rotate with the wheel when the sleeve is slid in one direction, and to disengage the wheel to allow the same to rotate freely when the sleeve is slid in the other direction.

The means to simultaneously release the clutch means and hold the same from turning may comprise a lever 7 provided with a detent 8 to engage ratchet teeth 9 on the clutch means, thereby to hold the clutch means from rotating at the same time that the lever slides the clutch means along the shaft to release the clutch from the wheel.

The means whereby the wheel is mounted to rotate in one direction only on the shaft may comprise ratchet-teeth 10 and dogs 11, the one being on the rim 12 of the wheel and the other on the internal portion 13 which is fixed by a pin 14 to the shaft and rotates therewith whenever the shaft rotates.

15 is a cam fixed on and rotating with the shaft and adapted to engage the clutch means to move the same into engaging position whenever the shaft rotates relative to the clutch means when said clutch means are out of operative position.

16 is a cam on the clutch means 3 to be engaged by the cam 15 for sliding the clutch means 3 into engagement with its detent 17 which is fixed to the fixed portion 13 of the wheel.

18 is a ratchet on the fixed portion 13 of the wheel, and 19 a dog on the loose rim 12 to which one end of spring 4 is fastened. The coils of spring 4 when unwound engage a portion, as pin 20 of the dog 19, to withdraw said dog from the ratchet 18 until the spring is again wound up sufficiently to allow the dog 19 to engage the ratchet 18, whereupon the further winding of the spring will be prevented as the loose rim 12 can no longer rotate relative to the fixed portion 13 of the wheel. As shown in Fig. 3, the dogs 11 and 19 do not engage their ratchets simultaneously. Play is provided so that one dog can be disengaged while the other is engaged. The ratchet teeth 18 are reverse to the ratchet teeth 10 so that they prevent the relative rotation between the parts in the direction in which the teeth 10 allow such rotation.

In practical use, the engine not shown rotating in the direction of the curved arrow in Fig. 1, constantly drives the cam 15 and the fixed portion 13 of the wheel 2. The cam 15 engaging its counterpart 16 will cause the clutch means 3 to move into clutch engagement with the clutch part 17 so that the clutch means and the counterpart move together. When the brake means 5 are applied to hold the rim 12 partially or wholly stationary relative to the rotating shaft 1, the spring is wound until the dog 19, being forced by its spring 21, engages the teeth 18 and thereupon the stress is directly from the rim 12 to the shaft through the dog 19 and teeth 18. The spring thus wound will remain wound until the clutch means 3 are disengaged. The wheel 2 is now practically a solid wheel, and the brake means can be applied from time to time to stop the machine without interference with or change of position of the spring.

When the engine has been stopped and it is desired to start it again, the operator will move the lever 7 to cause the detent 8 to engage the ratchet 9, and to slip the clutch means toward the cam 15. When the clutch means has come into position to engage with the cam 15 it becomes released from its counterpart 17 whereupon the reaction of the spring thus held stationary at the sleeve 3 operates through the rim 12, dog 11, ratchet 10 and fixed portion 13 of the wheel to rotate the shaft in the starting direction, thus starting up the engine. The operator, however, at once releases the lever 7; that is to say,—in starting the engine he will move the lever and thus release it so as to allow the cam 15 to return the clutch means 3 into engagement at the completion of one revolution of the shaft. The spring thus wound acts to rotate the shaft once, the momentum of the parts being depended upon to carry the engine into operation. In case the engine should fail to ignite at the first operation, the operation may be repeated a number of times until the spring is run down. Whenever the brake is applied, the spring is again wound so that there is constantly a stored force at the command of the operator for starting the engine into operation. Whenever the spring is wound the dog 19 engages to take the driving strain off the spring. The disengagement of the clutch means 3 is accomplished by moving the lever 7, causing the detent 8 to engage the ratchet teeth 9 and to move the clutch means 3 toward the cam 15 which engages to rotate the shaft.

22 designates the frame of an auto on which the device may be mounted. The spring 4 holds clutch 3 normally in engagement with its counterpart 17. In the construction shown, the tendency of the spring 4 is to hold the clutching means 3 in engagement with the detent 17, but the resiliency of the spring allows the member 3 to slide along the shaft sufficiently to release said detent; but immediately upon the release of the lever 7 the spring again operates to throw the clutch into engagement, thus assisting the positive action of the cam 15 on the cam 16.

What I claim is:—

1. A shaft, a wheel mounted to rotate thereon in one direction only relative to the shaft, clutch means rotatably mounted on the shaft to engage the wheel, a spring connection between the wheel and the clutch means, a brake for temporarily holding the wheel from turning, a toothed wheel upon the clutch means, and a lever for simultaneously releasing the clutch means from the wheel and engaging the teeth to hold the clutch means from rotating.

2. A shaft, a wheel mounted to rotate thereon in one direction only relative to the shaft, clutch means rotatably mounted on the shaft to engage the wheel, a spring connection between the wheel and clutch means, means for temporarily holding the wheel from turning, means to simultaneously release the clutch means and hold the same from turning, and means operated by the shaft for returning the clutch means into engagement with the wheel.

3. A shaft, a wheel mounted to rotate thereon in one direction only relative to the shaft; clutch means mounted to rotate on and slide along the shaft and provided with a ratchet, a cam on the shaft to move the clutch means into engagement with the wheel, and a lever provided with a detent arranged to hold the clutch means from turning and to move the same into position to be engaged by the cam.

4. A shaft, a wheel mounted to rotate thereon, clutch means rotatably mounted on the shaft to engage the wheel, a clock-spring connection between the wheel and the clutch means, a ratchet connection between the shaft and the wheel to allow the wheel to rotate in one direction only, said spring being arranged to release the ratchet connection as the spring unwinds; a brake for holding the wheel from turning, a toothed wheel upon the clutch means, and a lever for simultaneously releasing the clutch means and engaging the teeth of the toothed wheel to hold the clutch means against rotation.

5. A shaft, wheel mounted to rotate thereon in one direction only relative to the shaft, clutch means rotatably mounted on the shaft to engage the wheel, a spring connection between the wheel and the clutch means, a brake for the wheel, and a lever to simultaneously release the clutch means and hold the same from turning.

In testimony whereof, I have hereunto set my hand at Los Angeles California, this 7th day of July 1906.

ARTHUR G. WILLARD.

In presence of—
JAMES R. TOWNSEND,
BEULAH TOWNSEND.